M. N. LENNING.
PLOW.
APPLICATION FILED DEC. 30, 1913.
1,115,217.
Patented Oct. 27, 1914.
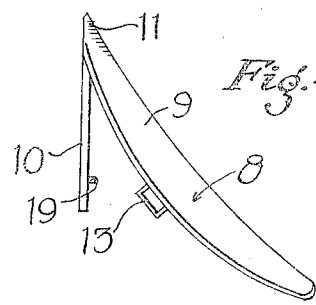
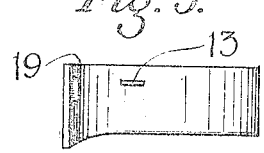
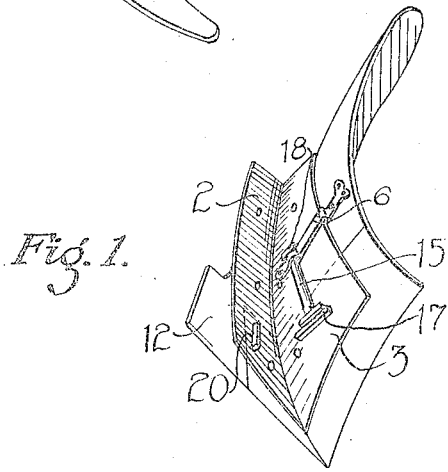
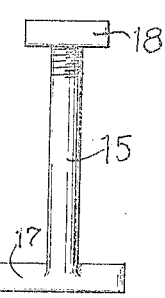
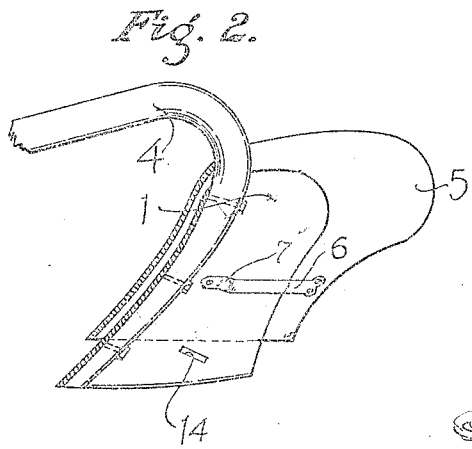
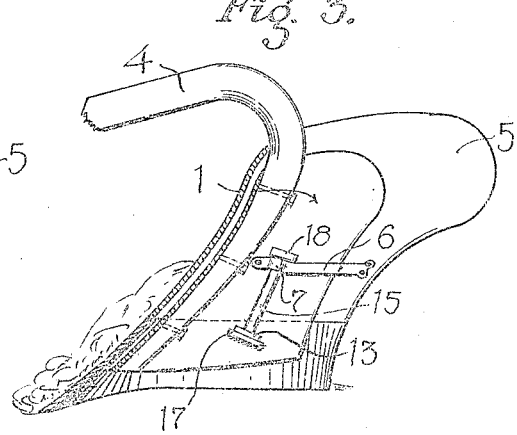
Witnesses
C. P. Newbold
A. E. Johnson
Inventor
M. N. Lenning.
By
Attorney

UNITED STATES PATENT OFFICE.

MALCOLM N. LENNING, OF ESKBANK, SASKATCHEWAN, CANADA.

PLOW.

1,115,217.      Specification of Letters Patent.      Patented Oct. 27, 1914.

Application filed December 30, 1913. Serial No. 809,581.

*To all whom it may concern:*

Be it known that I, MALCOLM N. LENNING, a subject of the King of Great Britain, residing at Eskbank, in the Province of Saskatchewan and Dominion of Canada, have invented certain new and useful Improvements in Plows; and I do hereby declare the following to be a full, clear, and exact description of the invention, such as will enable others skilled in the art to which it appertains to make and use the same.

This invention comprehends improvements in plows and relates more particularly to means for detachably connecting the plow share in position.

One of the objects of the invention is to provide a plow of such construction that the share may be quickly attached to the frog and quickly detached therefrom.

Another object of the invention is to provide a plow which shall be simple in construction, strong, durable, and cheap to manufacture.

Another object of the invention is to provide a fastening means for plow shares which will permit of the share being quickly removed without the necessity of inverting the plow or turning it on one side or the other.

With these and other objects in view as will become more apparent as the description proceeds, the invention consists in certain novel features of construction, combination and arrangement of parts as will be hereinafter fully described and claimed.

For a complete understanding of my invention, reference is to be had to the following description and accompanying drawings, in which—

Figure 1 is a perspective view of my improved plow as viewed from the inside thereof, Fig. 2 is a vertical sectional view showing the plow share removed, Fig. 3 is a similar view of a share in position, Fig. 4 is a top plan view of the plow share, Fig. 5 is a rear elevation thereof, and Fig. 6 is a detail view of the securing bolt.

Referring in detail to the drawing by numerals, 1 designates generally the frog which is formed by the landside and mold board plates 2 and 3, respectively, which diverge from their meeting edge so that the frog appears V-shaped in horizontal cross section.

4 designates the plow beam which may be bolted or otherwise rigidly secured in the crotch of the frog.

The mold board 5 rests against the lower surface of the mold board plate 3 of the frog and carries an arm 6 which extends into engagement of the underside of the plate 3, as clearly shown in Fig. 1. The arm 6 is riveted, or otherwise rigidly secured at its outer end, to the underside of the mold board and is formed adjacent its inner end with an eye 7.

The share, generally designated 8 consists of a wing 9 and a landside 10, the blade and landside converging at their forward extremities to form the cutting edge 11. The portion 9 of the share engages the lower edge of the moldboard and the upper face of the plate 3, while the landside 10 bears against the plate 2 adjacent the lower edge thereof, said plate is provided with an extension 12 which acts as a continuation of the landside 10 and engages the rear edge thereof. The wing 9 of the share is formed upon its inner side with a U-shaped lug, or eye 13, which fits through an opening 14 formed in the plate 3. A T-bolt 15 extends through the lug on the inside of the plate 3 and has a plate 17 for engagement with said lug. The bolt also passes through the eye 7 and is secured in position by a nut 18 which threads against said eye. The landside 10 formed upon its inner side with a lug 19 is disposed in a vertical plane and adapted to fit within an opening 20 formed in the plate 2 of the frog.

When the plow is in its assembled position, as shown in Fig. 1, the bolt and the lugs will be sufficient to hold the share firmly on to the frog. When it is desired to detach the share for any purpose whatsoever, it is only necessary to remove the nut 18 and then the bolt 15, after which the share can be detached from the frog.

From the foregoing description taken in connection with the accompanying drawings, it will be apparent that I have provided a very simple and efficient means for detachably securing a plow share in position, said means being so constructed and positioned as to permit of the share being detached without inverting the plow.

While I have shown and described the preferred embodiment of my invention, it will be understood that minor changes in construction, combination and arrangement of parts may be made without departing from the scope and spirit of the invention as claimed

Having thus described my invention, I claim:—

In a plow of the character described, the combination with a frog formed of a pair of converging plates, each of said plates being formed with an opening, a mold-board, an arm secured at one end to said mold-board and at the opposite end to the underside of one of the plates, said arm being formed with an eye, a share comprising a cutting blade and a landside, a U-shaped lug formed upon the inner side of the cutting blade and adapted to extend through one of the openings in the frog, a T-bolt passing through said lug and eye, a nut threaded upon the end of the bolt, and a lug carried by the landside for reception within the other opening formed in the frog.

In testimony whereof I affix my signature in presence of two witnesses.

MALCOLM N. LENNING.

Witnesses:
W. EDDY,
STEWART JARVIS.